(12) United States Patent
Schiegl (10) Patent No.: US 10,471,770 B2
(45) Date of Patent: Nov. 12, 2019

(54) LAMINATE AND METHOD FOR PRODUCING SAME

(71) Applicant: Fritz EGGER GmbH & Co. OG, St. Johann in Tirol (AT)

(72) Inventor: Walter Schiegl, St. Johann in Tirol (AT)

(73) Assignee: Fritz EGGER GmbH & Co. OG, St. Johann In Tirol (AT)

( * ) Notice: Subject to any disclaimer, the term of this patent is extended or adjusted under 35 U.S.C. 154(b) by 0 days.

(21) Appl. No.: 15/301,128

(22) PCT Filed: Mar. 25, 2015

(86) PCT No.: PCT/EP2015/056434
§ 371 (c)(1),
(2) Date: Sep. 30, 2016

(87) PCT Pub. No.: WO2015/150192
PCT Pub. Date: Oct. 8, 2015

(65) Prior Publication Data
US 2017/0015132 A1    Jan. 19, 2017

(30) Foreign Application Priority Data
Apr. 3, 2014   (DE) .................. 10 2014 104 760

(51) Int. Cl.
*D06N 7/04*     (2006.01)
*B44C 5/04*     (2006.01)
(Continued)

(52) U.S. Cl.
CPC ............. *B44C 5/0469* (2013.01); *B32B 3/30* (2013.01); *B32B 21/02* (2013.01); *B32B 29/005* (2013.01);
(Continued)

(58) Field of Classification Search
CPC ........ B44C 5/0469; B32B 21/00; B32B 21/02
See application file for complete search history.

(56) References Cited

U.S. PATENT DOCUMENTS 3,738,900 A    6/1973   Matzke
4,062,992 A    12/1977  Power et al.
(Continued)

FOREIGN PATENT DOCUMENTS

DE    2808626 A1    9/1979
DE    19942972 A1   3/2000
(Continued)

OTHER PUBLICATIONS

Ulrich Bens; "Siempelkamp short-cycle presses: Standard, high-end, and Eco: three sophisticated concepts"; Bulletin The Siempelkamp Magazine; 2012; pp. 58-63; issue 02. (submitted with English-language translation).D

*Primary Examiner* — Prashant J Khatri
*Assistant Examiner* — Zachary M Davis
(74) *Attorney, Agent, or Firm* — The Webb Law Firm (57) ABSTRACT

A laminate for application onto a support material having a resin-impregnated decorative layer and at least one resin-impregnated core layer. The decorative layer and the at least one core layer are adapted for being pressed together under high pressure and heat. A technical problem of improving a laminate for application onto the support material is solved in that the decorative layer and the at least one core layer can be compressed by a short-cycle press and have a width of more than 1800 mm. A method for producing the laminate is also provided.

8 Claims, 4 Drawing Sheets

(51) Int. Cl.
  *B32B 29/00*   (2006.01)
  *B44C 1/24*    (2006.01)
  *B32B 21/02*   (2006.01)
  *B32B 29/02*   (2006.01)
  *B32B 3/30*    (2006.01)
  *B32B 37/10*   (2006.01)

(52) U.S. Cl.
  CPC .............. *B32B 29/02* (2013.01); *B32B 37/10* (2013.01); *B44C 1/24* (2013.01); *B32B 2260/028* (2013.01); *B32B 2260/046* (2013.01); *B32B 2307/538* (2013.01); *B32B 2317/125* (2013.01); *B32B 2451/00* (2013.01); *B32B 2607/00* (2013.01)

(56) References Cited

U.S. PATENT DOCUMENTS

| | | | |
|---|---|---|---|
| 4,140,837 A | 2/1979 | Drees et al. | |
| 2008/0010930 A1* | 1/2008 | Mao | B32B 3/30 52/403.1 |
| 2009/0078129 A1 | 3/2009 | Cappelle et al. | |
| 2010/0112285 A1* | 5/2010 | Decoene | B32B 38/06 428/141 |
| 2011/0104431 A1* | 5/2011 | Niedermaier | B30B 15/062 428/106 |
| 2012/0318453 A1 | 12/2012 | Zierold | |
| 2013/0101793 A1* | 4/2013 | Saitou | B44C 1/1712 428/141 |
| 2014/0242342 A1 | 8/2014 | Vandevoorde et al. | |
| 2015/0158330 A1 | 6/2015 | Stoffel et al. | |
| 2016/0067909 A1 | 3/2016 | Peuster | |

FOREIGN PATENT DOCUMENTS

| | | | |
|---|---|---|---|
| DE | 10122967 A1 | 11/2002 | |
| DE | 10217919 A1 | 11/2003 | |
| DE | 10316884 A1 | 11/2004 | |
| DE | 202012004375 U1 | 8/2012 | |
| DE | 102012107526 A1 | 5/2014 | |
| WO | 2006136949 A2 | 12/2006 | |
| WO | 2011076916 A1 | 6/2011 | |
| WO | 2013/050910 A2 | 4/2013 | |
| WO | WO 2013113667 A1 * | 8/2013 | .......... C04B 41/009 |

* cited by examiner

Fig.8 state of the art

Fig.9 state of the art

LAMINATE AND METHOD FOR PRODUCING SAME

CROSS-REFERENCE TO RELATED APPLICATIONS

This application is the United States national phase of International Application No. PCT/EP2015/056434 filed Mar. 25, 2015, and claims priority to German Patent Application No. 10 2014 104 760.5 filed Apr. 3, 2014, the disclosures of which are hereby incorporated in their entirety by reference.

BACKGROUND OF THE INVENTION

Field of the Invention

The invention relates to a laminate for application on a support material, in particular on a support plate, with a resin-impregnated decorative layer and with at least one resin-impregnated core layer, wherein the decorative layer and the at least one core layer are suitable to be pressed together under high pressure and heat by means of a multi piston press. The invention also relates to a method for producing a laminate.

Description of Related Art

Laminates known from the prior art of the DE 199 42 972 A1, DE 103 16 884 A1, U.S. Pat. Nos. 3,738,900 A, 4,062,992, and the U.S. Pat. No. 4,140,837 A are an extremely versatile material that can be processed in combination with wooden materials or other carrier materials to form so-called composite elements. The applications are diverse and require the use of various laminate qualities that can be adapted to the subsequent areas of use. Conventional applications and areas of use include for example the kitchen sector, door hardware, office furniture equipment, exhibition construction, shop-fitting, decorative interior fittings, flooring, ship building and vehicle construction. Laminates are thus understood to include decorative materials that can satisfy different requirements. There are for example standard quality laminates, re-mouldable decorative laminates that can also be shaped at higher temperatures, or decorative laminates with improved fire behaviour.

The laminates include decorative laminates based on curable resins. They are composed of several layers and consist for example of at least one melamine resin-impregnated decorative paper as decorative layer and one or more natron kraft papers impregnated with phenol resin as core layers, which can be pressed together under high pressure and heat. The laminate structure, resin and paper qualities, surface structures, the use of special overlays (protective layers) as well as the pressing parameters in the production are decisive in regard to the laminate quality and thus for the subsequent application and area of use.

The decorative side of the laminate, the decorative layer, can consist of decorative paper, which is printed as wood decoration or fantasy decoration, or may consist of uni-decorations or white decorations, which are formed for example as plastic layers. The surface weights of the decorative papers are generally between 50 and 160 g/m$^2$.

An essential constituent of laminates may be core papers, for example natron kraft papers, which are also called core layers or core plies. The surface weight of the core papers and natron kraft papers is in the range from 70 to 300 g/m$^2$, wherein high grammages are mainly used for compact panels.

An overlay is a bleached, transparent paper with a high resin absorption capability and is used to protect the decoration, in particular the printed image of printed decorative papers and to improve the abrasion resistance.

An underlay or barrier paper is a paper layer between the decorative and core or natron kraft paper, which is used to prevent chemical reaction between the resins or to achieve optical effects.

Melamine-formaldehyde resins form transparent and hard coatings and are therefore best suited as surface layer of decorative laminates. To impregnate the core layers relatively elastic phenol-formaldehyde resins are used, not only for cost reasons.

Decorative laminates can therefore consist of cellulose fibre webs or papers, which are impregnated with thermosetting resins. Other natural or synthetic materials can also be used as carrier material for the resins. Thus, laminates of fibreglass matting impregnated with resin are known. The layers, preferably the paper layers, are joined to one another to form the laminate by the production methods described hereinafter. The application of heat and pressure thereby causes the resins to flow and subsequently harden. Owing to the crosslinking of the resins, preferably enhanced by the cellulose fibres of the papers, a very dense material with a closed surface is formed. In this connection individual paper layers, and also an outer paper layer, may be un-impregnated before the pressing, since during pressing the resin also penetrates previously un-impregnated layers.

At the start of the method the layers of the laminate are placed above one another and are then brought between two pressing means in the form of press plates or press belts. These pressing means are heated to a predetermined temperature, so that during the pressing procedure not only a sufficient pressure but also the necessary temperature is applied to the layers. The high-pressure method is thus defined by the simultaneous application of heat (temperature ≥120° C.) and a high pressure (≥25 bar), so that the thermosetting resins flow and then harden, in order to produce a homogeneous, non-porous material of increased density (≥1.35 g/cm$^3$) and of the required surface finish.

The aforementioned pressing means normally have a very smooth surface in order to achieve a correspondingly smooth and therefore shiny surface of the laminate. It is also known to provide the pressing means applied to the side of the decorative layer with a macroscopic structure, in order to produce a visible surface structure, possibly synchronised with the decoration. This leads together with the decoration to an improved natural-looking surface appearance. In the case of endless production by means of a double-belt press the production of synchronised structures is however not possible or only possible under very stringent conditions, on account of the fluctuating paper growth and on account of the slippage between the steel belt and workpiece. With multi daylight presses on the other hand depending on the structure press plates corresponding to the number of platens of the press would have to be available, which is extremely uneconomical.

Known production methods include CPL methods, where CPL is the abbreviation for continuous pressed laminates, and HPL methods, where HPL is the abbreviation for high pressure laminates.

CPL are produced in continuously operating double-belt presses with a pressure between 25 and 50 bar and temperatures between 150° C. and 170° C. The feed rate varies between 8 and 30 m/min depending on the laminate thickness and the pressing zone length.

HPL are up to now produced in discontinuously operating multi daylight presses, in which a plurality of units consisting of two press plates and layers arranged in between are stacked above one another, which are pressed in a single pressing step at a pressure between 70 and 80 bar and temperatures of more than 120° C. The multi-daylight presses can have up to 45 platens and each platen can be filled with up to 24 laminate layers (thickness ca. 0.50 to 1.90 mm). Depending on the press loading and the maximum temperature the complete pressing cycle including an optional reverse cooling lasts about 100 minutes.

The length and width formatting of HPL takes place in separate work steps before the pressing, in which materials having a width of up to about 1,300 mm can be produced. CPL on the other hand can be cut to width and/or formatted to length or wound onto rollers directly online after the press. The maximum width of CPL is in this case in the region of 1,300 mm.

In addition short-cycle presses are known, in which support materials such as wood material plates can be coated with laminates. Laminates of the present type cannot up to now be pressed on the known short-cycle presses, since the thin laminates cannot compensate for pressure differences over the surface. Because significant differences in pressure occur in conventional short-cycle presses, not least on account of the imprecise control of the press cylinders. With carrier materials of sufficient thickness these pressure differences can however be well compensated by the carrier material, for example a chipboard panel or a medium-density fibre panel.

Furthermore a multi-piston press is known, for example the KT 700 press from the company Siempelkamp. Compared to hitherto installed presses the multi-piston press uses several small hydraulic cylinders, which for their part can be individually controlled. Accordingly very slight tolerances in the parallelism of the press plates can be achieved, so that an extremely regular distribution of the pressing force is reached.

This press is however up to now also only used to coat wood material support plates or to produce compact plates. In particular minimum interspacings of more than 2 mm are preset by mechanical spacers at the factory, which make it impossible to press laminates.

After the production of the laminate, said laminate is bonded, generally in a separate process step and with a time delay, to a support material or a support plate. In order to be able to bond laminates better to a support plate, the rear sides of the latter are ground. By means of the grinding a surface structure is obtained that is easily wettable. The disadvantage of grinding the rear side however is that the laminate thereby becomes unsymmetrical and also tends to bulge. Therefore extremely detailed storage and handling measures and special precautions have to be taken. In addition the processing is therefore also made significantly more complicated.

Furthermore the grinding leads to an at least partial, preferably almost complete abrasion of the topmost resin layer, so that the paper layer arranged underneath is at least partially exposed. The surface tension is therefore reduced and the wettability of the surface alters. Moisture can therefore penetrate into the laminate during storage, before the adhesive can be applied shortly before the processing. In addition the adhesive can in some cases penetrate too deeply into the laminate structure, so that more adhesive than necessary has to be used for the bonding to the support plate.

SUMMARY OF THE INVENTION

A technical problem forming the basis of the present invention is therefore to devise and modify a lamination for application to a support material, in particular to a support plate, and provide a method for producing a laminate so that the aforementioned disadvantages are eliminated.

The technical problem described above is solved according to the invention by a laminate in which the thickness of the stack of the decorative layer and the at least one core layer after pressing is less than 2 mm and that the decorative layer and the at least one core layer have a width of more than 1,800 mm.

In addition the decorative layer and the at least one core layer can have a length of up to 5,600 mm. In this connection the thickness of the stack of the decorative layer and the at least one core layer after the pressing is preferably less than 1.5 mm and the decorative layer and the at least one core layer preferably have a width of more than 2,000mm.

Such extensive laminates according to the invention can be used for example for table surfaces and work surfaces of relatively large width or also in exhibition construction, where larger elements are required for the cladding of surfaces.

Furthermore the same textured panels that are used for the direct coating of wooden material support plates can advantageously be used to produce the laminate. In direct coating a laminate is not applied to the support plates, but decorative papers impregnated with synthetic resin, optionally with an additional underlay and/or overlay paper, are pressed directly onto the support plates. Also in this case a press plate can be used in order to emboss a macroscopic structure.

According to the invention laminates are provided for the first time with the identical structure that is used by directly coated plates. In addition to the guaranteed, exact structure composite, the expensive procurement of various pressing tools, as would be necessary in the operation of different plants, is thereby also avoided. Accordingly different structures in a wider variety can be offered, since the investment costs per structure are correspondingly lower.

In particular the advantage compared to the hitherto used multi-daylight presses and double-belt presses is that synchronised structures can be embossed economically. Synchronised structures are understood to be macroscopic structures that produce a visible surface structure on the decoration that is essentially or only section wise synchronised with the decoration and during the pressing are embossed into the surface of the laminate. In addition the devices used for aligning paper and pressing tool in the production of coated wooden plates can be used without any adaptation also for laminates.

In a further preferred manner the surface of the layer arranged opposite to the decorative layer is provided with an embossed structure, which corresponds with regards to its depth and geometry to a structure produced by grinding and that the geometry of the embossed structure corresponds to a grinding groove structure. In this way a surface is obtained that can be well bonded similarly to a ground surface, without the mechanical grinding procedure of the surface producing an irregular surface or an asymmetry of the layer structure. A structure that corresponds substantially to a structure produced by grinding is understood in the context of this invention to be a structure whose dimensions are comparable to the dimensions of a structure produced by mechanical grinding.

Owing to the embossing of the structure during the production of the laminate the uppermost resin layer is modulated and remains as a coherent and thus sealing layer, so that despite the introduction of the structure into the surface no moisture can penetrate into the laminate during subsequent storage. The adhesive required for the processing of the laminate can therefore be applied in a smaller amount than in the case of a surface ground as described above with a lower surface tension. In this connection there are no adverse effects on quality in the processing during the bonding on the support plate.

The wettability can be used as a measure and thus as a distinguishing feature of the quality of the surface of the embossed laminate compared to a ground laminate. The wettability depends on the surface tension of the surface, in which the so-called contact angle can be used as a measure. The size of the contact angle between the liquid and surface depends on the interaction between the liquid and the surface at the contact surface. The smaller this interaction is, the greater is the contact angle. A measure of the wettability can thus be determined by measuring the contact angle.

In fact, ground surfaces as described above as prior art have a low surface tension and thus a good wettability. If a drop of tap water having a maximum diameter of 15 mm is applied at room temperature the contact angle has a low value in the region of less than 20° or less than 10°. In the case of an embossed surface the contact angle of an identical water drop is above 40°, in particular above 50°. To perform the measurement of the contact angle and to characterise the specific properties of the tap water, reference is made to the specific description.

A further distinguishing feature between a laminate having an embossed structure and an actually ground laminate surface is whether and to what extent water penetrates through the surface into the laminate. With an embossed surface an applied water drop slides off and the water does not penetrate the laminate or only slightly, since the topmost impregnated layer has an embossed structure, so that the structure of the embossed layer as such remains coherent. With a ground surface of a laminate, whose outer layer consists of a material such as for example paper impregnated with resin but which is water-absorbent, the water of the applied water drop penetrates the ground surface into the laminate. The fact is the coherent resin layer is destroyed by the grinding of the surface and is completely removed in some sections, so that the water-absorbing layer is exposed. Readily visible damp regions of the laminate are formed in the area around the water drop.

In a preferred arrangement of the laminate the embossed structure corresponds in depth and/or geometry to a structure produced by grinding, in which preferably the depth of the embossed structure has a mean roughness of less than 20 μm, in particular less than 10 μm, and/or in which the geometry of the embossed structure corresponds to a grinding groove structure, in particular of parallel running grooves.

Thus structures are also included which, although they have a roughness of less than 20 μm, however are not formed in the shape of grooves, but in different geometrical, preferably round or polygonal shapes. In addition structures are also covered which, although they have a geometry corresponding to a grinding groove structure, nevertheless their roughness is at least partly greater than 20 μm. A combination of both features is preferred however.

In a further preferred manner the layer arranged opposite to the decorative layer formed as decorative paper is formed as a counteracting paper which corresponds in regard to its properties substantially to those of the decorative paper. In this way a bulging or deformation of the laminate on account of different mechanical stresses can be reduced or even avoided. Preferably, the layer arranged opposite to the decorative paper is impregnated with a resin, which corresponds in its tensile behaviour to the resin that is used to impregnate the decorative paper, which is preferably of the same type.

The previously described layers are preferably, as explained above, formed of paper layers, thus decorative paper, kraft paper as core layers, counteracting paper or overlay paper. However, the invention is not limited to the use of different paper layers. Thus, for example also synthetic layers or materials of natural substances, preferably of wood or fabric, can contribute at least partially to the structure of the laminate.

As already mentioned above, pressing means are required for the production of a laminate, which exert for a predetermined time a sufficient pressure and a predetermined pressing temperature on the laminate. Preferably pressing means with a pressing surface having a structure that corresponds substantially to a structure produced by grinding are used for producing the laminates according to the invention.

In this case too, as already explained above, the structure used for the embossing of the lower layer of the laminate can correspond in regard to depth and/or geometry to a structure produced by grinding, in particular the depth of the structure can have a mean roughness of less than 20 μm, in particular less than 10 μm, and/or preferably the geometry of the structure can have a grinding groove structure, in particular of parallel running grooves.

The technical problem described above is also solved by a method for producing a laminate, in which a resin-impregnated decorative layer and at least one resin-impregnated core layer are arranged in layers on top of one another and in which the decorative layer and the at least one core layer are pressed together under high pressure and heat, in which the decorative layer and the at least one core layer have a width of more than 1,800 mm, preferably a width of more than 2,000 mm, and in which the decorative layer and the at least one core layer are pressed together in a single-level multi piston short-cycle press.

In addition it is preferred if the layer arranged on the side opposite to the decorative layer is pressed and embossed with a pressing means having a structure in which the said structure corresponds substantially to a structure produced by grinding.

BRIEF DESCRIPTION OF THE DRAWINGS

The invention is described in more detail hereinafter with the aid of exemplary embodiments, and with reference to the accompanying drawings, in which.

DETAILED DESCRIPTION OF THE INVENTION

Figure 1:
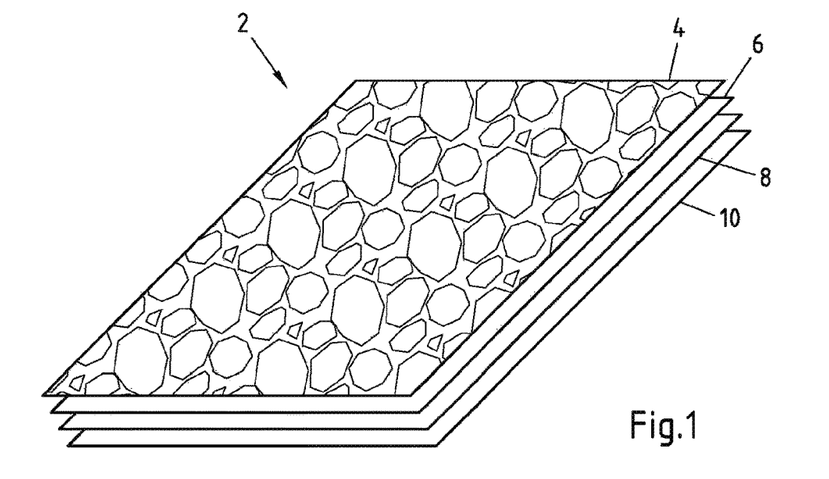
FIG. 1 shows a structure of a first laminate before the pressing.

FIG. 1 shows a layer structure of a laminate 2 for application on a support material, in particular on a support plate, before the pressing. The laminate 2 has a resin-impregnated decorative paper 4 as decorative layer and three resin-impregnated kraft papers 6, 8 and 10 as core layers. The decorative paper 4 and the core papers 6, 8 and 10 are suitable to be pressed together under high pressure and heat. The desired laminate 2 is thereby produced. The decorative paper 4 has on its surface an optical pattern as decoration. Instead of the printed decorative paper 4 a monochrome decorative paper can also be used.

According to the invention the decorative layer 4 and the at least one core layer 6, 8, 10 can be pressed by means of a short-cycle press 40, which is described in more detail hereinafter, and the decorative layer 4 and the at least one core layer 6, 8, 10 have a width of more than 1,800 mm, in particular more than 2,000 mm. Furthermore the decorative layer 4 and the at least one core layer 6, 8, 10 have a length of for example 5,600 mm. Finally, the thickness of the stack of the decorative layer 4 and the at least one core layer 6, 8, 10 after the pressing is less than 2 mm, preferably less than 1.5 mm.

In addition the kraft paper 10 arranged opposite to the decorative paper 4 is provided with an embossed structure during the pressing, which corresponds substantially to a structure produced by grinding. The embossed structure imparts to the surface of the layer 10 an enlarged surface, so that the bonding to a support plate is improved.

Figure 2:
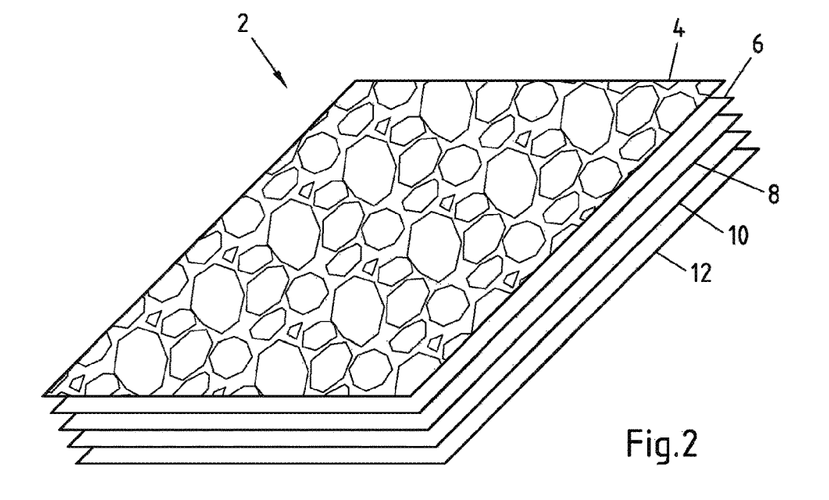
FIG. 2 shows a structure of a first laminate before the pressing.

FIG. 2 shows a second exemplary embodiment of a layer structure of a laminate 2 according to the invention, here with a bottom layer 12 formed as counteracting layer. In this case the counteracting layer 12 being the bottom layer is provided with the embossed structure during the pressing. In order to further minimise a warping of a laminate constructed in this way, the counteracting layer or the counteracting paper are impregnated with a resin that has a similar tensile behaviour as the resin used for the impregnation of the decorative paper. Preferably the same resin, in particular melamine resin, is used.

Figure 3:
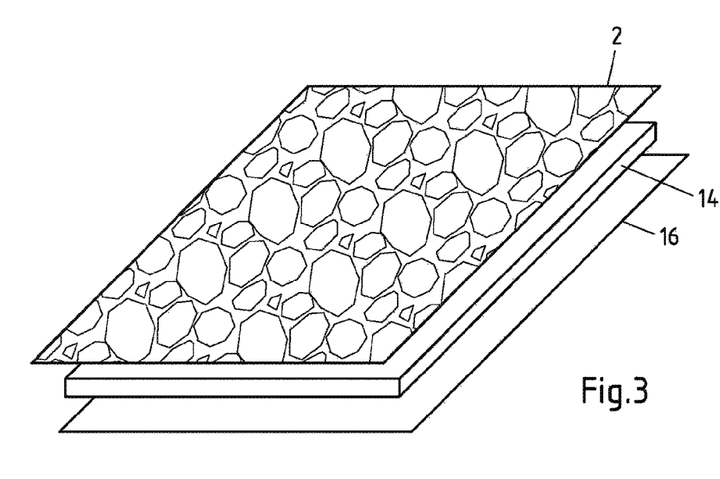
FIG. 3 shows a finished laminate before the pressing onto a support plate.

FIG. 3 shows a laminate 2 produced according to the invention in a stack with a support plate 14 of wooden material, for example a MDF plate (medium density fibreboard plate) or a HDF plate (high density fibreboard plate) and a counteracting layer 16 arranged underneath the support plate 14. This stack is then processed further in a press under the application of pressure and temperature to form a laminated wood material panel.

The impregnated structure of the lowermost layer 10 or 12 corresponds in depth and/or geometry to a structure produced by grinding. In this connection identical geometries and/or identical topographies, i.e. a true copy of a structure produced by mechanical grinding, are not important. The fact is the effect achieved according to the invention on the surface is obtained if the same mechanical dimensions are maintained. These dimensions are in fact decisive for the good bonding properties.

Therefore for example the depth of the embossed structure with a mean roughness of less than 20 μm, in particular less than 10 μm, which is also produced in a typical grinding process, is chosen. At the same time or alternatively the geometry of the embossed structure corresponds to a grinding groove structure, in particular of parallel running grooves.

An example of a structure according to the invention is illustrated hereinafter in the form of a table, in which the structure has been characterised with conventional parameters. The measurement was carried out with an area-based method for 3D surface measurement according to EN ISO Standard 25178. In particular the focus variation as area-based measurement method was employed in this case.

| Name | Value | [μ] | Description |
| --- | --- | --- | --- |
| Ra | 1.25 | μm | Mean roughness of the profile |
| Rq | 8.45 | μm | Root mean square of the roughness of the profile |
| Rt | 43.9 | μm | Overall height of the roughness profile |
| Rz | 28.8 | μm | Averaged height of the roughness profile |
| Rmax | 34.0 | μm | Maximum height of the roughness profile within an individual measuring section |
| Rp | 21.2 | μm | Height of the largest profile peak of the roughness profile |
| Rv | 22.7 | μm | Depth of the largest profile valley of the roughness profile |
| Rc | 25.6 | μm | Mean height of the profile irregularities of the roughness profile |
| Rsm | 364 | μm | Mean interspacing of the profile irregularities of the roughness profile |

Figure 4:
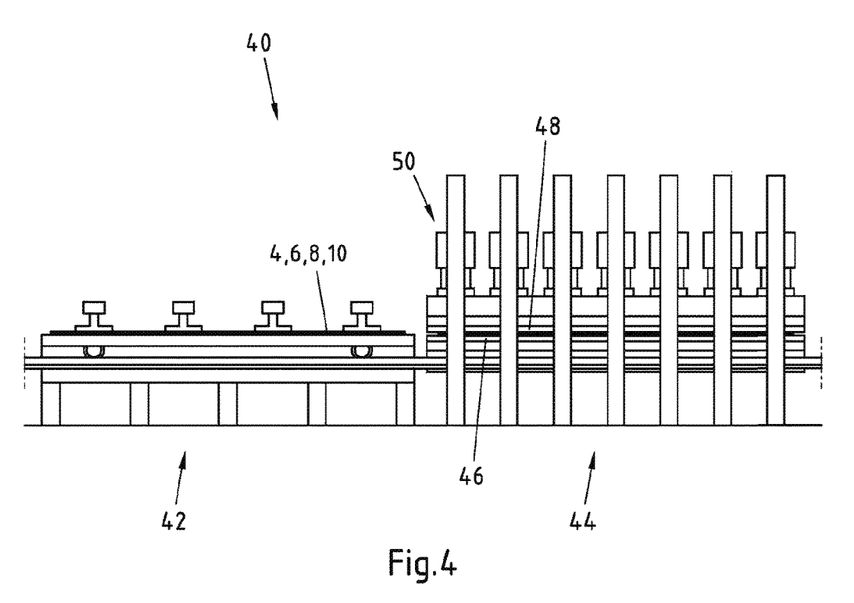
FIG. 4 is a schematic representation of a cycle press with a press plate according to the invention.

FIG. 4 now shows a press 40 for producing laminates, which operates according to the HPL short-cycle method. In the left-hand region of FIG. 4 a stacking device 42 is illustrated, in which the several layers 4 to 10 of the laminate 2 to be formed are stacked on top of one another according to the exemplary embodiment of FIG. 2. These layers are cut to size, i.e. sheets predetermined in regard to their length and width.

The stacked layers 4 to 10 are conveyed by means of a linear transporter to the pressing station 44 shown on the right-hand side and are arranged between a lower pressing plate 46 and an upper pressing plate 48. By means of a plurality of pressure cylinders 50 the upper pressing plate 48 is lowered so that the stacked layers 4 to 10 are pressed together under high pressure. Since the pressing plates 46 and 48 are also preheated, in addition to the pressure a high temperature is also applied. After a predetermined period the pressing station 44 is opened and the finished laminate is removed.

The special feature of the short-cycle press 40 is the fact that the individual pressure cylinders can be controlled separately. Thus, an exact control of the distance between the two pressing plates 46 and 48 is possible, so that also thin stacks of layers of the laminate to be produced having a thickness of less than 2 mm can be pressed.

Figure 5:
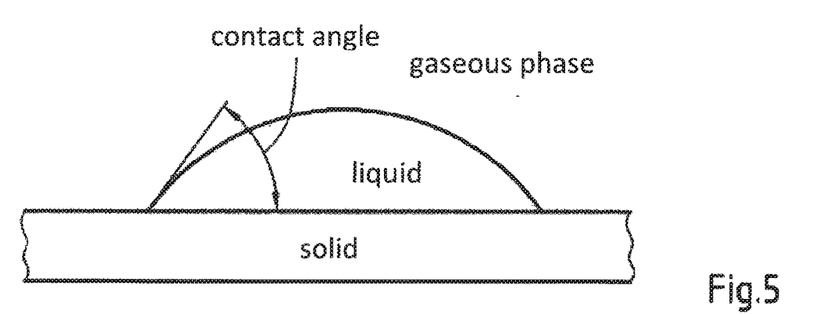
FIG. 5 is a simplified diagram to explain the term contact angle.

FIG. 5 shows a simplified diagram to illustrate the term contact angle. A drop of a liquid that is surrounded by a gaseous phase, preferably air, is located on the surface of the solid. Owing to the surface tension of the liquid on the one hand and the surface tension of the surface of the solid on the other hand, the illustrated drop shape is formed. At the three-phase point, i.e. where the solid phase, the liquid phase and the gaseous phase are present next to one another, the surface of the drop shape forms an angle with the surface of the solid, which is termed the contact angle. Since the surface tension of the liquid plays a role in the formation of the drop shape, the area of the surface that is covered by the liquid on the surface of the solid is also important for determining the contact angle. Therefore the liquid is usually applied in such a way that it does not exceed a predetermined area. For example, when using water an area of more than 15 mm diameter should not be exceeded.

Figure 6:
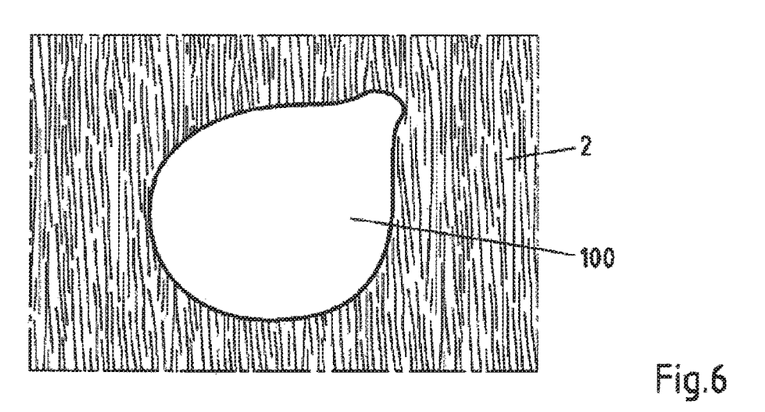
FIG. 6 is a schematic representation of a water drop on the surface of an embossed laminate in a diagonal plan view.

FIG. 6 shows a schematic representation of a water drop 100 on the surface of an embossed laminate 2 in a diagonal plan view. The water drop 100 is sharply definable in terms of its contour, the surrounding sections of the surface are not wetted, and the material lying underneath the laminate 2 has not absorbed any moisture, which can be recognised by the uniform coloration of the surface.

Figure 7:
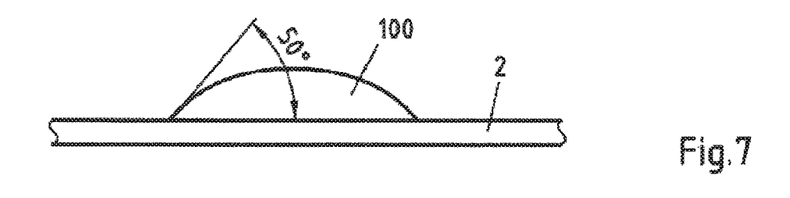
FIG. 7 is a schematic representation of a water drop on the surface of an embossed laminate in a side view to measure the contact angle.

FIG. 7 shows a schematic representation of a water drop 100 on the surface of an embossed laminate 2 in a side view in order to determine the contact angle.

To determine the contact angle the drop shape analysis (DSA) method can be used for example. The drop shape analysis is an image analysis method used to determine the contact angle from a side view or from the shadow image of a drop located on the surface. For this, a drop is placed on a solid surface (sessile drop). An image of the drop is taken with a camera.

For a rough analysis, which is generally sufficient, the angle between the liquid surface and the surface of the laminate can be directly measured in the image using a ruler. In the present case the contact angle was measured in this way in FIG. 7 using a ruler and found to be 50°.

For a more accurate analysis the image can be processed by a drop shape analysis software. By means of a grey level analysis of the image a contour recognition performed initially. In the second step a geometrical model describing the drop shape is fitted by a mathematical method to the shape. The contact angle is then found from the angle between the determined drop shape function and the sample surface, whose projection in the drop image is termed base line.

Figure 8:
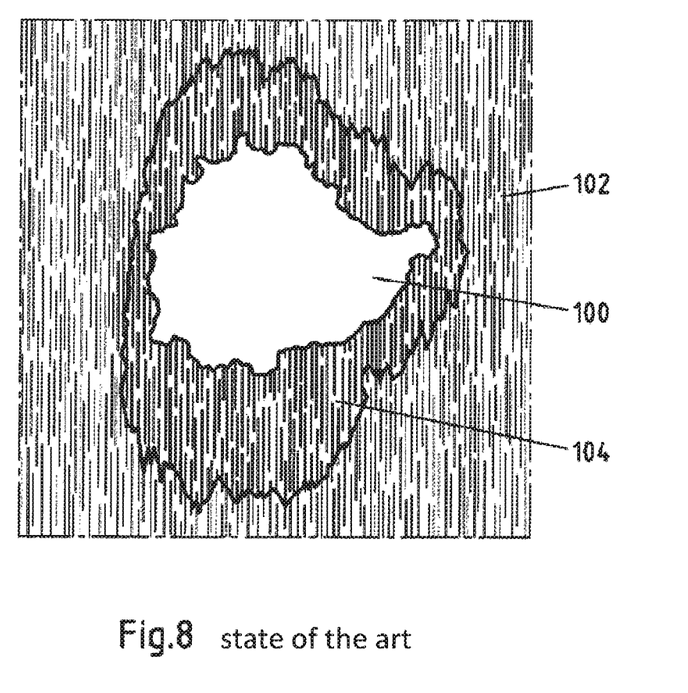
FIG. 8 is a schematic representation of a water drop on a ground surface of a laminate (prior art) in a diagonal plan view.

FIG. 8 shows a schematic representation of a water drop 100 on a ground surface of a laminate 102 in a diagonal plan view, i.e. on a sample as it is known from the prior art.

In contrast to FIG. 6 the sessile drop 100 can no longer be sharply defined and the drop 100 has a flatter shape than that shown in FIG. 6. In addition the regions 104 of the surface surrounding the drop 100 have become wet, which means that some of the water of the drop 100 has been absorbed by the laminate 102. The wetness is demonstrated by the dark discoloration compared to the significantly lighter outer surroundings of the surface.

Figure 9:
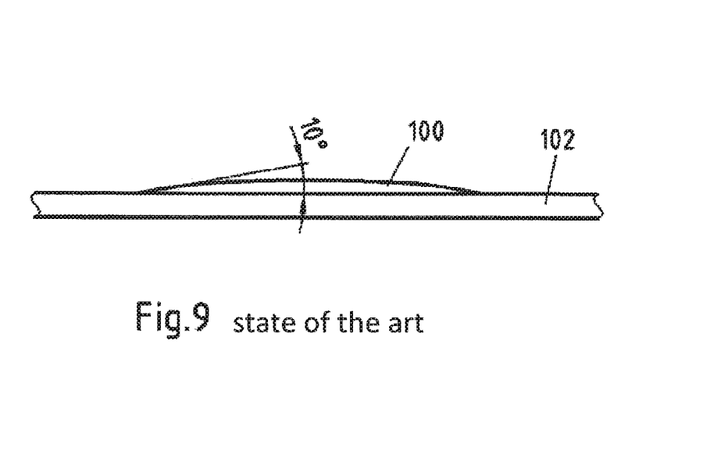
FIG. 9 is a schematic representation of a water drop on a ground surface of a laminate (prior art) in a side view to measure the contact angle.

FIG. 9 shows a schematic representation of a water drop on a ground surface of a laminate 102 in a side view in order to determine the contact angle. As already follows from FIG. 8, the drop 100 has a flatter shape and the contact angle was measured in the photograph with a ruler and found to be 10°.

For the illustrated experiments according to FIGS. 6 to 9 tap water was used having the following physical and chemical properties:

water temperature 20° C. (room temperature)
pH 7.5
electrical conductivity at 25° C.: 709 µS/cm
carbonate hardness: 11.0° dH
total hardness: 13.4° dH with an alkaline earth total of 2.4 mmol/l
nitrate NO3: 12 mg/l
nitrite NO2: <0.02 mg/l
phosphate (total): $PO_4^{3-}$: 1.2 mg/l
silicia $SiO_2$: 8.8 mg/l
fluoride F: 0.13 mg/l
chloride Cl: 74 mg/l
sulphate $SO_4^{2-}$: 59 mg/l
hydrogen carbonate $HCO_{3-}$: 213 mg/l mg/l
sodium $Na^+$: 35 mg/l
magnesium $Mg^{2+}$: 11 mg/l
calcium $Ca^{2+}$: 79 mg/l
potassium $K^+$: 4 mg/l The drop size was chosen so that the drop occupied an area with a diameter of ca. 10 to 15 mm, in the ground laminates according to FIGS. 8 and 9 to start with before the drop began to disintegrate.

The invention claimed is:

1. A laminate for application on a support material, the laminate comprising:
    a resin-impregnated decorative layer; and
    at least one resin-impregnated core layer,
    wherein the decorative layer and the at least one core layer are adapted to be pressed together under high pressure and heat by a multi piston short-cycle press,
    wherein
    a thickness of a stack of the decorative layer and the at least one core layer after pressing is less than 2 mm, wherein
    the decorative layer and the at least one core layer has a width of more than 1,800 mm,
    wherein a top surface of a bottom layer is arranged directly on one of the at least one core layers opposite to the decorative layer, and a bottom surface of the bottom layer is provided with an embossed structure configured to be pressed on the support material, wherein the embossed structure comprises a grinding groove, and
    wherein when a drop of tap water at room temperature having a maximum diameter of 15 mm is provided on the embossed structure, the drop of tap water forms a contact angle greater than 40° with the bottom layer having the embossed structure.

2. The laminate according to claim 1, wherein the decorative layer and the at least one core layer have a length equal to or less than 5,600 mm.

3. The laminate according to claim 1, wherein the thickness of the stack of the decorative layer and the at least one core layer after the pressing is less than 1.5 mm.

4. The laminate according to claim 1, wherein the depth of the embossed structure has a mean roughness of less than 20 µm.

5. The laminate according to claim 1, wherein the grinding groove comprises parallel running grooves.

6. The laminate according to claim 5, wherein the bottom layer is impregnated with a resin, which corresponds in its tensile behaviour to the resin that is used for the impregnation of the decorative paper.

7. The laminate according to claim 1, wherein the bottom layer is a decorative, counteracting paper having corresponding properties to those of the decorative paper.

8. A method for producing a laminate, the method comprising:
    arranging a resin-impregnated decorative layer and at least one resin-impregnated core layer in layers on top of one another; and
    pressing the decorative layer and the at least one core layer together under high pressure and heat by a single-level multi piston short-cycle press,
    wherein
    a thickness of a stack of the decorative layer and the at least one core layer after pressing is less than 2 mm,
    wherein the decorative layer and the at least one core layer have a width of more than 1,800 mm, wherein a top surface of a bottom layer is arranged directly on one of the at least one core layers opposite to the decorative layer, and a bottom surface of the bottom layer is provided with an embossed structure configured to be pressed on the support material, wherein the embossed structure comprises a grinding groove, and wherein when a drop of tap water at room temperature having a maximum diameter of 15 mm is provided on the embossed structure, the drop of tap water forms a contact angle greater than 40° with the bottom layer having the embossed surface.

* * * * *